US012540061B2

(12) United States Patent
Du et al.

(10) Patent No.: US 12,540,061 B2
(45) Date of Patent: Feb. 3, 2026

(54) LIFTING MECHANISM

(71) Applicants: Danfoss Power Solutions (Jiangsu) Co., Ltd., Jiangsu (CN); Danfoss Power Solutions Inc., Ames, IA (US)

(72) Inventors: Zhekang Du, Nordborg (DK); Xiaozhong Chen, Nordborg (DK)

(73) Assignees: DANFOSS POWER SOLUTIONS (JIANGSU) CO., LTD, Jiangsu (CN); DANFOSS POWER SOLUTIONS INC., Ames, IA (US)

( * ) Notice: Subject to any disclaimer, the term of this patent is extended or adjusted under 35 U.S.C. 154(b) by 563 days.

(21) Appl. No.: 17/887,885

(22) Filed: Aug. 15, 2022

(65) Prior Publication Data

US 2023/0174354 A1 Jun. 8, 2023

(30) Foreign Application Priority Data

Dec. 6, 2021 (CN) ......................... 202111482082.4
Dec. 6, 2021 (CN) ......................... 202123056345.3

(51) Int. Cl.
*F15B 11/044* (2006.01)
*B66F 3/32* (2006.01)
(Continued)

(52) U.S. Cl.
CPC .................. *B66F 3/32* (2013.01); *B66F 9/22* (2013.01); *F15B 11/04* (2013.01); *F15B 11/044* (2013.01);
(Continued)

(58) Field of Classification Search
CPC ....... F15B 11/04; F15B 11/044; F15B 11/046; F15B 11/048; F15B 21/14; E02F 9/2217
See application file for complete search history.

(56) References Cited

U.S. PATENT DOCUMENTS 3,512,072 A 5/1970 Karazija et al.
3,630,025 A 12/1971 Henry
(Continued)

FOREIGN PATENT DOCUMENTS

CN 102134048 A 7/2011
CN 203321761 U 12/2013
(Continued)

OTHER PUBLICATIONS

T. Minav et al. "Electric energy recovery system for a hydraulic forklift—theoretical and experimental evaluation." IET Electric Power Applications. 2011. pp. 377-385. vol. 5, Iss. 4.
(Continued)

*Primary Examiner* — Michael Leslie
(74) *Attorney, Agent, or Firm* — McCormick, Paulding & Huber PLLC

(57) ABSTRACT

A lifting mechanism has a descending mode including an energy-regeneration mode and a non-energy-regeneration mode. The lifting mechanism includes: a battery, an electric machine, a hydraulic pump, an oil tank, a hydraulic cylinder, a work platform and a flow limiting valve. In the energy-regeneration mode, the hydraulic fluid drives the hydraulic pump to operate as a hydraulic motor, thus in turn driving the electric machine to operate as a generator and charge the battery. In the non-energy-regeneration mode, the flow limiting valve limits the maximum of the descending speed of the work platform. In the present application, the flow limiting valve is used to provide throttling resistance to limit the maximum of the descending speed of the hydraulic fluid, thus in turn defining the maximum of the descending speed of the work platform. Therefore, in the present application, by using the flow limiting valve to define the maximum of the descending speed of the work platform, the safety problem due to an accelerated descent during descending of
(Continued)

the work platform may be solved, and thus the safety of the lifting mechanism may be ensured.

18 Claims, 3 Drawing Sheets

(51) Int. Cl.
*B66F 9/22* (2006.01)
*F15B 11/04* (2006.01)
*F15B 21/14* (2006.01)

(52) U.S. Cl.
CPC ..... *F15B 21/14* (2013.01); *F15B 2211/20515* (2013.01); *F15B 2211/40* (2013.01); *F15B 2211/8636* (2013.01)

(56) References Cited

U.S. PATENT DOCUMENTS

| | | | |
|---|---|---|---|
| 3,774,726 | A | 11/1973 | Bredberg |
| 3,947,744 | A | 3/1976 | Grace et al. |
| 4,690,606 | A | 9/1987 | Ross |
| 4,723,107 | A | 2/1988 | Schmid |
| 5,012,898 | A | 5/1991 | Tsymberov |
| 5,024,141 | A | 6/1991 | Kawada |
| 5,505,043 | A | 4/1996 | Baginski et al. |
| 5,649,422 | A | 7/1997 | Baginski et al. |
| 5,862,663 | A | 1/1999 | Lanza et al. |
| 6,005,360 | A | 12/1999 | Pace |
| 6,189,432 | B1 | 2/2001 | Colarelli et al. |
| 6,848,253 | B2 | 2/2005 | Johansson et al. |
| 7,770,697 | B2 | 8/2010 | Futahashi et al. |
| 8,246,008 | B2 * | 8/2012 | De Jong ................... B66F 7/16 254/9 B |
| 9,422,949 | B2 * | 8/2016 | He ............................ B66F 9/22 |
| 9,482,248 | B2 | 11/2016 | Ma et al. |
| 10,844,879 | B2 * | 11/2020 | Ueda ....................... F15B 13/01 |
| 10,927,854 | B2 * | 2/2021 | Olesen ...................... B66F 9/22 |
| 11,441,585 | B2 * | 9/2022 | Buscicchio ............. F15B 21/14 |
| 2004/0003589 | A1 | 1/2004 | Johansson et al. |
| 2008/0041047 | A1 | 2/2008 | Kato |
| 2008/0128214 | A1 | 6/2008 | Tahashi et al. |
| 2011/0198141 | A1 | 8/2011 | Clark et al. |
| 2012/0023924 | A1 | 2/2012 | Clark et al. |
| 2014/0283509 | A1 | 9/2014 | Hijikata |
| 2014/0331662 | A1 | 11/2014 | Ueda et al. |
| 2015/0013324 | A1 | 1/2015 | Matsuo et al. |
| 2019/0002258 | A1 | 1/2019 | Zhou et al. |
| 2020/0317065 | A1 | 10/2020 | Lombardo |
| 2023/0174354 | A1 | 6/2023 | Du et al. |

FOREIGN PATENT DOCUMENTS

| | | | |
|---|---|---|---|
| CN | 104080726 | A | 10/2014 |
| CN | 103539037 | B | 2/2016 |
| CN | 206889376 | U | 1/2018 |
| CN | 207819534 | U | 9/2018 |
| CN | 110454445 | A | 11/2019 |
| CN | 112688390 | A | 4/2021 |
| CN | 212868045 | U | 4/2021 |
| CN | 113148914 | A | 7/2021 |
| CN | 113339334 | A | 9/2021 |
| CN | 113404748 | A | 9/2021 |
| CN | 113809797 | A | 12/2021 |
| CN | 215486885 | U | 1/2022 |
| CN | 216642599 | U | 5/2022 |
| CN | 116221199 | A | 6/2023 |
| DE | 2804720 | A1 | 8/1978 |
| DE | 102011053958 | A1 | 3/2013 |
| DE | 102014105127 | A1 | 10/2015 |
| EP | 1193211 | B1 | 1/2007 |
| GB | 1294249 | A | 10/1972 |
| GB | 1365511 | A | 9/1974 |
| GB | 2502060 | A | 11/2013 |
| JP | H02-028499 | A | 1/1990 |
| JP | 3376263 | B2 | 2/2003 |
| JP | 2003192299 | A | 7/2003 |
| JP | 2005053693 | A | 3/2005 |
| JP | 2008087914 | A | 4/2008 |
| JP | 2009298543 | A | 12/2009 |
| SU | 1661140 | A1 | 7/1991 |
| WO | 2014095240 | A1 | 6/2014 |
| WO | 2022/105098 | A1 | 5/2022 |

OTHER PUBLICATIONS

Tatiana A. Minav et al. "Detailed analysis of electro-hydraulic lifting system's energy efficiency with direct electric drive pump control." Automation in Constructions. 2013. 17 pages.

Tatiana Minav et al. "Electric or Hydraulic Energy Recovery Systems in a Reach Truck—a Comparison." Journal of Mechanical Engineering. 2014. pp. 232-240. vol. 60, Iss 4.

Lukasz Stawinski et al. "Energy Consumption Structure and Its Improvement of Low-Lifting Capacity Scissor Lift." Energies. Mar. 2, 2021. 14 pages. vol. 14.

First Office Action for Canadian Patent Application No. 3,164,505, dated Oct. 17, 2023.

First Office Action for Canadian Patent Application No. 3, 164,508, dated Oct. 24, 2023.

* cited by examiner

LIFTING MECHANISM

CROSS-REFERENCE TO RELATED APPLICATION

This application claims foreign priority benefits under U.S.C. § 119 from Chinese Patent Applications No. 202111482082.4, filed Dec. 6, 2021, and No. 202123056345.3, filed Dec. 6, 2021, the contents of each of which are hereby incorporated by reference in its entirety.

TECHNICAL FIELD

The present application relates to the mechanical technical field, and specifically to a lifting mechanism.

BACKGROUND

A lifting mechanism is working tool widely used in the fields of aerial working, cargo transportation, etc. With the development of technology, electrically driven lifting mechanisms become more and more widely used. In order to extend the service life of a battery, the battery is charged by converting the potential energy that the work platform in the lifting mechanism has due to descending into electric energy. However, during conversion of potential energy into electric energy, there may be a certain safety hazard in the lifting mechanism.

SUMMARY

In view of this, embodiments of the present application aim to provide a lifting mechanism comprising a flow limiting valve, in which the flow limiting valve is used to adjust the maximum of a descending speed of a work platform of the lifting mechanism in a descending mode of the lifting mechanism, to solve the safety problem due to descending too fast of the work platform of the lifting mechanism.

In the present application, a lifting mechanism is provided, comprising: a battery, an electric machine, a hydraulic pump, an oil tank, a hydraulic cylinder and a work platform; the lifting mechanism has a descending mode comprising an energy-regeneration mode in which the hydraulic fluid drives the hydraulic pump to operate as a hydraulic motor, thus in turn driving the electric machine to operate as a generator and charge the battery; wherein the descending mode of the lifting mechanism further comprises a non-energy-recycling mode; the lifting mechanism further comprises a flow limiting valve provided between the hydraulic cylinder and the hydraulic pump and the oil tank and between the hydraulic cylinder and the oil tank, for limiting a maximum of a descending speed of the work platform in the non-energy-regeneration mode.

In the present application, the flow limiting valve is used to provide throttling resistance to limit the maximum of the descending speed of the hydraulic fluid, thus in turn defining the maximum of the descending speed of the work platform such that the safety of the lifting mechanism is ensured.

In the present application, the hydraulic pump may operate as a hydraulic motor. In the ascending mode, the hydraulic pump rotates forward to pump the hydraulic fluid from the oil tank into the hydraulic cylinder, thus in turn pushing a telescopic rod of the hydraulic cylinder to move upwards so as to raise the work platform. In the energy-regeneration mode of the descending mode, the hydraulic pump is rotated reversely, with the effect of the potential energy of the hydraulic fluid, to drive the electric machine to operate as a generator for generating electricity.

In an embodiment, the flow limiting valve is provided adjacent to an outlet of the hydraulic cylinder.

In the present application, by providing the flow limiting valve at the outlet of the hydraulic cylinder, it is possible to ensure that in case of breaking in any position of the whole hydraulic line of the lifting mechanism, the work platform may descend smoothly and stably, and thus the safety of the lifting mechanism may be ensured.

In an embodiment, the flow limiting valve has a throttling resistance in a first position lower than that in a second position, and when a pressure difference between two sides of the flow limiting valve is larger than a predetermined pressure difference, the flow limiting valve switches from the first position to the second position.

The position of the flow limiting valve is controlled by the pressure difference between two sides of the flow limiting valve. The flow limiting valve, by switching between the first position and the second position of the flow limiting valve, adjusts the maximum of the descending speed of the hydraulic fluid, thus in turn adjusting the descending speed of the work platform.

In an embodiment, in the energy-regeneration mode, the flow limiting valve is in the first position, and in the non-energy-regeneration mode, the flow limiting valve is in the second position.

In the energy-regeneration mode, the pressure difference between two sides of the flow limiting valve is less than a predetermined pressure difference; in the non-energy-regeneration mode, the pressure difference between two sides of the flow limiting valve is larger than the predetermined pressure difference. In the present application, as the flow limiting valve comprises a first orifice having a fixed size, the pressure difference between two sides of the flow limiting valve is in positive correlation to a flow passing through the flow limiting valve. Therefore, it is possible to switch the position of the flow limiting valve when the pressure difference (or flow) between two sides of the flow limiting valve is abnormal, ensuring smooth and stable descending of the work platform.

In the energy-regeneration mode, it is necessary to convert the potential energy of the hydraulic fluid into kinetic energy of the electric machine and then into electric energy. Therefore, it is necessary to have a relatively low throttling resistance between the hydraulic fluid in the hydraulic cylinder and the hydraulic line, to facilitate conversion from the potential energy of the hydraulic fluid into kinetic energy to drive running of the electric machine. In the non-energy-regeneration mode, the potential energy is consumed at the orifice, and converted into thermal energy, and the hydraulic fluid flows slowly to the oil tank at a constant rate, to ensure smooth and stable descending of the work platform. Therefore, if there is no failure in the lifting mechanism, in the energy-regeneration mode, the flow limiting valve is in the first position with low throttling resistance, while in the non-energy-regeneration mode, the flow limiting valve is in the second position with high throttling resistance.

In an embodiment, the flow limiting valve comprises a first orifice and a selection valve connected with each other, the selection valve having a communicating position and a throttling position in which a second orifice takes effect; when the selection valve is in the communicating position, the flow limiting valve is in the first position; when the selection valve is in the throttling position, the flow limiting valve is in the second position.

In an embodiment, the second orifice has a size less than that of the first orifice.

When the pressure difference between two sides of the flow limiting valve is larger than a predetermined pressure difference, the selection valve switches from the communicating position to the throttling position, i.e. switching from the first orifice to the second orifice, thus limiting the descending speed of the work platform by the second orifice.

In an embodiment, in the energy-regeneration mode, the descending speed of the work platform is controlled by the electric machine; in the non-energy-regeneration mode, the maximum of the descending speed of the work platform is set by the second orifice.

In an embodiment, the selection valve further comprises a spring, when the pressure difference between two sides of the flow limiting valve is less than a predetermined pressure difference set by the spring, the selection valve is in the communicating position; when the pressure difference between two sides of the flow limiting valve is larger than the predetermined pressure difference set by the spring, the selection valve is in the throttling position.

In the present application, the spring is used to limit the maximum of the pressure difference between two sides of the flow limiting valve, the structure thereof is simple and the cost of the lifting mechanism may be reduced. The flow limiting valve comprising the spring may, in case of an abnormal pressure difference, adjust the pressure difference rapidly to avoid descending too fast of the work platform due to descending too fast of the hydraulic fluid, and thus in turn a safety hazard may be avoided.

In an embodiment, the flow limiting valve comprises a proportional valve for continuously adjusting the flow resistance.

In an embodiment, the proportional valve has a maximum permissible opening degree which is set according to precalibrated data and in terms of a real-time pressure of the hydraulic cylinder correspondingly, or is directly set according to a maximum pressure of the hydraulic cylinder permitted by the work platform.

In an embodiment, the lifting mechanism further comprises: a reversing valve which performs switching between the energy-regeneration mode and the non-energy-regeneration mode by selectively connecting the hydraulic cylinder to the hydraulic pump or the oil tank.

In an embodiment, the lifting mechanism further comprises: a throttle valve provided between the reversing valve and the oil tank, with the throttle valve comprising a hole having a size less than that of the second orifice; in the energy-regeneration mode, the descending speed of the work platform is controlled by the electric machine; in the non-energy-regeneration mode, the descending speed of the work platform is set by the size of the hole of the throttle valve; in an abnormal descending of the work platform, the maximum of the descending speed of the work platform is set by the flow limiting valve.

In the non-energy-regeneration mode, it is possible to use the throttle valve to control the descending speed of the hydraulic fluid. The flow limiting valve, in normal operation cases (including the ascending mode, the hold mode, the energy-regeneration mode and the non-energy-regeneration mode), is always in the communicating position, and switches to the throttling position only in abnormal cases, such as the hydraulic line being broken. By such configuration, it is possible to reduce the frequency of switching of the flow limiting valve and reduce the time duration for which the flow limiting valve is in the throttling position such that the service life of the flow limiting valve may be longer and the safety of the whole lifting mechanism is ensured. Compared with the flow limiting valve, the throttle valve is low in cost and is easy to replace and it is possible to reduce the cost by providing the throttle valve between the reversing valve and the oil tank.

In an embodiment, the lifting mechanism further comprises: a throttle valve, in the energy-regeneration mode or the non-energy-regeneration mode, the flow limiting valve is in the first position, and in an abnormal descending of the work platform, the flow limiting valve is in the second position.

In an embodiment, a proportional valve or switch valve is provided between the flow limiting valve and the reversing valve, the proportional valve or switch valve comprises a unidirectional communication position in which the hydraulic fluid is permitted to flow from the hydraulic pump to the flow limiting valve in a unidirectional way, and a bidirectional communication position.

By switching the position of the proportional valve or switch valve to the bidirectional communication position, the lifting mechanism is switched to the descending mode.

In the present application, in the energy-regeneration mode, the hydraulic cylinder is communicated with the hydraulic pump, and in the non-energy-regeneration mode, the hydraulic cylinder is communicated with the oil tank. The switching between the energy-regeneration mode and the non-energy-regeneration mode is achieved by switching of the position of the reversing valve.

In an embodiment, the lifting mechanism further comprises: a controlling device, which, upon receiving a descending command, switches the proportional valve or switch valve to the bidirectional communication position, and under a predetermined condition, switches the position of the reversing valve such that the hydraulic cylinder is switched from a state of connection with the hydraulic pump to a state of connection with the oil tank, to switch from the energy-regeneration mode to the non-energy-regeneration mode.

In an embodiment, the predetermined condition comprises any one of: state-of-charge of the battery higher than a predetermined value, failure of the battery, failure of the electric machine, and other system failures.

In an embodiment, the lifting mechanism further comprises a proportional valve or switch valve connected to the flow limiting valve; when the proportional valve or switch valve is a proportional valve, in the energy-regeneration mode, the descending speed of the work platform is controlled by the electric machine; in the non-energy-regeneration mode, the descending speed of the work platform is set by an opening degree of the proportional valve or switch valve; in an abnormal descending of the work platform, the maximum of the descending speed of the work platform is set by the flow limiting valve.

In an embodiment, the lifting mechanism comprises two or more hydraulic cylinders, a corresponding flow limiting valve is provided adjacent to an outlet of each hydraulic cylinder, and each flow limiting valve is connected to the proportional valve or switch valve.

In the present application, the lifting mechanism comprising two or more hydraulic cylinders may improve the maximum load value of the lifting mechanism.

In an embodiment, the lifting mechanism further comprises an overflow valve provided in parallel to the proportional valve or switch valve.

In an embodiment, the lifting mechanism further comprises a steering device, and the reversing valve connects one of the hydraulic pump and the oil tank to the steering device and connects the other of the hydraulic pump and the oil tank to the hydraulic cylinder.

In an embodiment, the lifting mechanism is a scissor lift.

In the present application, a lifting mechanism is provided. In a energy-regeneration mode, a hydraulic fluid drives a hydraulic pump to operate as a hydraulic motor, thus in turn driving the electric machine to operate as a generator and charge the battery. In the non-energy-regeneration mode, the flow limiting valve limits the maximum of the descending speed of the work platform. In the present application, the flow limiting valve is used to provide throttling resistance to limit the maximum of the descending speed of the hydraulic fluid, thus in turn defining the maximum of the descending speed of the work platform. Therefore, by defining the maximum of the descending speed of the work platform, the lifting mechanism in the present application, comprising the flow limiting valve, may solve the safety problem due to an accelerated descent of the work platform during descending thereof, and thus the safety of the lifting mechanism may be ensured.

DETAILED DESCRIPTION

Figure 1:
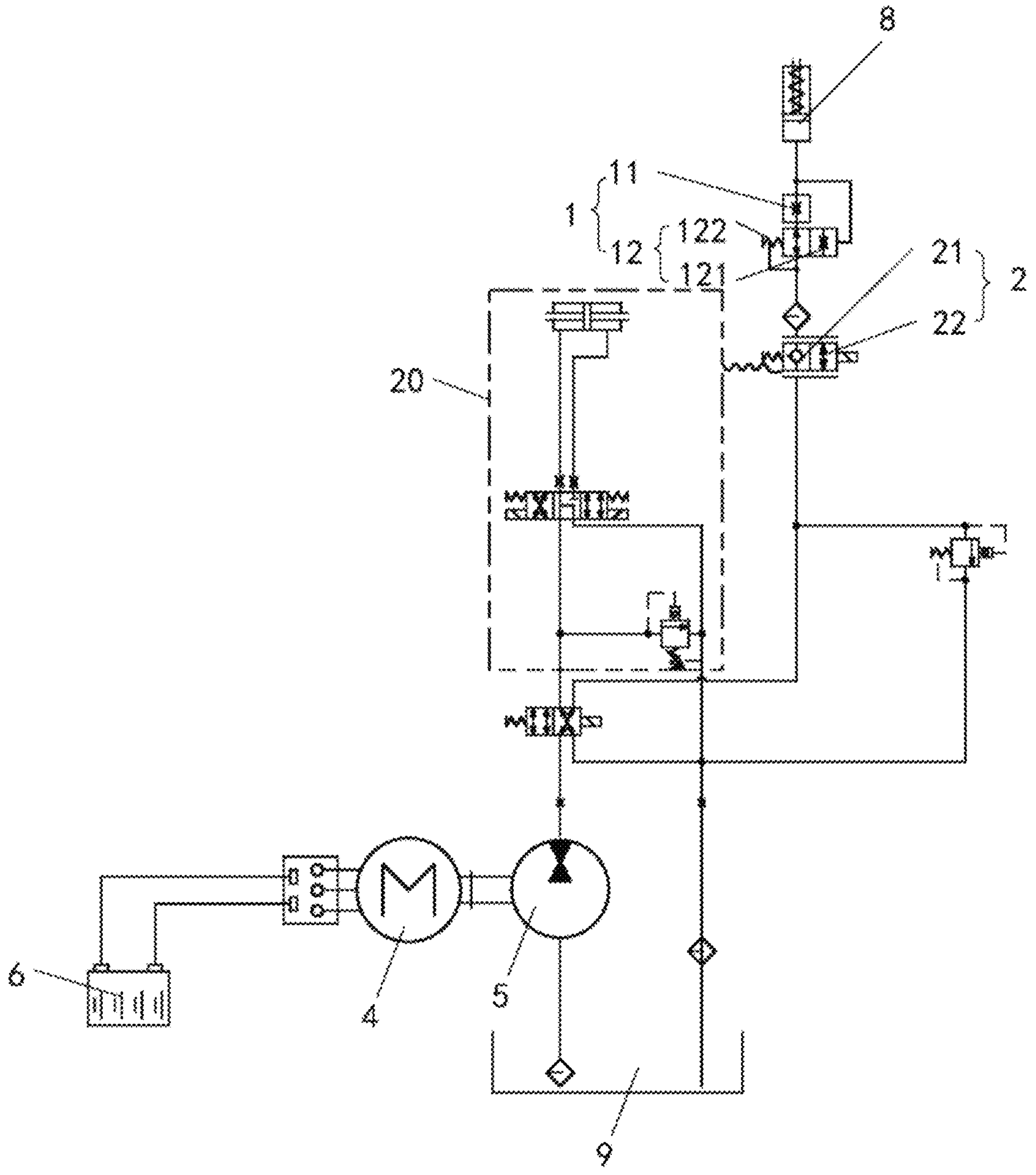
FIG. 1 is a hydraulic schematic diagram of a lifting mechanism as provided in an embodiment of the present application.

Hereinafter, the technical solutions in the embodiments of the present application will be described clearly and completely in combination with the accompanying drawings in the embodiments of the present application. Certainly, the described embodiments are only some of the embodiments of the present application, rather than all the embodiments. Based on the embodiments in the present application, any other embodiments obtained, without any inventive work, by those skilled in the art will fall within the protection scope of the present application.

Generally, a lifting mechanism has an ascending mode, a hold mode and a descending mode. In the ascending mode, the work platform moves upward under the effect of a hydraulic cylinder; in the hold mode, the work platform is substantially stationary; in the descending mode, the work platform moves downward. The lifting mechanism controls the height of the work platform by switching between different modes, so as to transport the item(s) or person(s) carried by the work platform from high to low, or vise versa.

As a battery of the lifting mechanism has a limited capacity, the lifting mechanism thus may not meet the service need of all day running. Therefore, it is necessary to charge it in a workday, thus limiting the working time duration of the lifting mechanism during a workday. In order to improve the utilization of an electrically driven lifting mechanism, a lifting mechanism is required to operate without charging the battery during the workday and then charge the battery overnight. For this, the descending mode of the lifting mechanism of an embodiment of the present application comprises an energy-regeneration mode in which the potential energy that the work platform of the lifting mechanism has in descending is converted into electric energy to extend the service life of the battery.

However, the lifting mechanism having the energy-regeneration mode still has a safety hazard during use. In the energy-regeneration mode, the descending speed of the work platform is controlled by an electric machine. In abnormal cases, such as the downstream hydraulic flexible hose being broken or failure of the electric machine, the electric machine may not function to control the descending speed of the work platform. The work platform will suddenly descend rapidly and thus have a certain safety hazard, prone to cause injury and death of the person(s) on the work platform as well as damage to property. In this regard, in an embodiment of the present application, a lifting mechanism is provided, which may solve at least the safety problem due to fast descending of the work platform in case of failure of the lifting mechanism in the energy-regeneration mode.

It should be understood that the lifting mechanism in the present application may be a mechanical apparatus for lifting, used for carrying items or persons working aloft or the like, and may be an aerial working platform or a forklift, etc. for example. In an embodiment of the present application, the lifting mechanism to be explained may be an aerial working platform as an example, and specifically, the lifting mechanism is a scissor lift.

FIG. 1 is a hydraulic schematic diagram of a lifting mechanism as provided in an embodiment of the present application. As shown in FIG. 1, the lifting mechanism may comprise a driving system, a steering system, and a lifting system. The embodiments of the present application mainly solve the safety problem due to descending too fast of the work platform of the lifting mechanism. In order to better set forth the technical problem to be solved by the present application, FIG. 1 emphasizes a hydraulic line in the lifting system while the structures of the driving system and the steering system are partially omitted.

As shown in FIG. 1, the lifting mechanism of an embodiment of the present application comprises: a proportional valve or switch valve 2, a reversing valve 3, an electric machine 4, a hydraulic pump 5, a battery 6, a hydraulic cylinder 8, an oil tank 9, and a work platform (not shown) driven by the hydraulic cylinder 8. The hydraulic cylinder 8, the proportional valve or switch valve 2, the reversing valve 3, the hydraulic pump 5 and the oil tank 9 are connected in sequence by the hydraulic line. The lifting mechanism further comprises a steering device 20 which is connected via the reversing valve 3 to the hydraulic pump 5 or the oil tank 9.

The lifting mechanism of an embodiment of the present application comprises an ascending mode, a hold mode, and a descending mode. The descending mode comprises two modes: an energy-regeneration mode and a non-energy-regeneration mode.

Optionally, as another embodiment, the lifting mechanism may further comprise a flow limiting valve 1 provided between the hydraulic cylinder 8 and the proportional valve or switch valve 2. The flow limiting valve 1 is used to provide throttling resistance, so as to adjust the maximum flow rate of the hydraulic fluid in the hydraulic line. The flow limiting valve 1 has a throttling resistance in a first position lower than that in a second position.

The proportional valve or switch valve 2 comprises a unidirectional communication position 21 in which the hydraulic fluid is permitted to flow from the hydraulic pump 5 to the flow limiting valve 1 in a unidirectional way, and a bidirectional communication position 22. For example, the proportional valve or switch valve 2 is a two-position-two-way valve.

The reversing valve 3 performs switching between the energy-regeneration mode and the non-energy-regeneration mode by selectively connecting the hydraulic cylinder 8 to the hydraulic pump 5 or the oil tank 9. For example, the reversing valve 3 is a two-position-four-way valve, connecting one of the hydraulic pump 5 and the oil tank 9 to the steering device 20 and connecting the other of the hydraulic pump and the oil tank to the hydraulic cylinder 8.

In the ascending mode, the flow limiting valve 1 is in the first position, the proportional valve or switch valve 2 is in the unidirectional communication position 21 in which the hydraulic fluid is permitted to flow from the hydraulic pump 5 to the flow limiting valve 1 in a unidirectional way, and the reversing valve 3 is in a position in which the hydraulic pump 5 is communicated with the hydraulic cylinder 8. The oil tank 9, the hydraulic pump 5, the reversing valve 3, the proportional valve or switch valve 2, the flow limiting valve 1 and the hydraulic cylinder 8 are communicated in sequence by the hydraulic line. The hydraulic fluid in the oil tank 9, with the effect of the hydraulic pump 5, enters the hydraulic cylinder 8, pushing a telescopic rod in the hydraulic cylinder 8 to move upwards so as to raise the work platform.

In the hold mode, the flow limiting valve 1 and the proportional valve or switch valve 2 are in the same positions as those in the ascending mode. The hydraulic pump 5 stops operation, or is connected via the reversing valve 3 to the steering device 20. No hydraulic fluid is provided to the hydraulic cylinder 8, and thus the work platform is kept at a certain height.

In the energy-regeneration mode in the descending mode, the flow limiting valve 1 is in the first position with low flow resistance, the proportional valve or switch valve 2 is in the bidirectional communication position 22, and the reversing valve 3 is in the position in which the hydraulic pump 5 is communicated with the hydraulic cylinder 8. The hydraulic cylinder 8, the flow limiting valve 1, the proportional valve or switch valve 2, the reversing valve 3, the hydraulic pump 5 and the oil tank 9 are communicated in sequence by the hydraulic line. The hydraulic fluid in the hydraulic cylinder 8 passes in sequence through the flow limiting valve 1, the proportional valve or switch valve 2 and the reversing valve 3, drives the hydraulic pump 5 to operate as a hydraulic motor, and then flows into the oil tank 9, in turn driving the electric machine 4 to operate as a generator and charge the battery 6. The rotation speed of the electric machine 4 is controlled to control the rotation speed of the hydraulic pump 5, thus in turn controlling the flow rate of the hydraulic fluid and the descending speed of the work platform. In short, the descending speed of the lifting mechanism is controlled by the electric machine 4. For a traditional orifice having a fixed size, the maximum of the descending speed is set in terms of a maximum load, and it is inevitable for the descending speed of the work platform to be too slow when it is not loaded or is not fully loaded. In contrast, by controlling the descending speed of the work platform by the electric machine 4, it may be ensured that it may be descended at a maximum permissible safe speed no matter when it is fully loaded or is not loaded/not fully loaded. The descending speed may be adjusted more freely, improving the operation efficiency in a maximum degree.

In the non-energy-regeneration mode in the descending mode, the flow limiting valve 1 is in the second position with high flow resistance, the proportional valve or switch valve 2 is in the bidirectional communication position 22, and the reversing valve 3 is in the position in which the oil tank 9 is communicated with the hydraulic cylinder 8. The hydraulic cylinder 8, the flow limiting valve 1, the proportional valve or switch valve 2, the reversing valve 3 and the oil tank 9 are communicated in sequence by the hydraulic line. The hydraulic fluid in the hydraulic cylinder 8 passes through the flow limiting valve 1, the proportional valve or switch valve 2 and the reversing valve 3 in sequence, and then flows into the oil tank 9.

The hydraulic pump 5 may operate as a hydraulic motor. In the ascending mode, the hydraulic pump 5 rotates forward to pump the hydraulic fluid from the oil tank 9 into the hydraulic cylinder 8, thus in turn pushing a telescopic rod of the hydraulic cylinder 8 to move upwards so as to raise the work platform. In the energy-regeneration mode of the descending mode, the hydraulic pump 5 is rotated reversely, with the effect of the potential energy of the hydraulic fluid, to drive the electric machine 4 to operate as a generator for generating electricity.

The battery 6 may be a Li-ion battery. On one hand, the battery 6 provides electric energy to the lifting mechanism. For example, in the ascending mode, it provides electric energy for driving the electric machine 4 to operate. On the other hand, in the energy-regeneration mode, the battery 6 is charged to store the electric energy generated by the electric machine 4 (operating as a generator at this time).

The flow limiting valve 1 is used to provide throttling resistance for limiting the maximum of the descending speed of the hydraulic fluid, thus in turn defining the maximum of the descending speed of the work platform. Specifically, the flow limiting valve 1 comprises two states: a first position and a second position. The flow limiting valve 1 has a throttling resistance in the first position lower than that in the second position. When a pressure difference between two sides of the flow limiting valve 1 is larger than a predetermined pressure difference, the flow limiting valve 1 switches from the first position to the second position. Therefore, the maximum of the descending speed of the hydraulic fluid is adjusted by switching the flow limiting valve 1 between the first position and the second position, thus in turn adjusting the descending speed of the work platform.

Further, the position of the flow limiting valve 1 is adjusted according to the pressure difference between two sides of the flow limiting valve 1. Normally, in the energy-regeneration mode, the pressure difference between two sides of the flow limiting valve 1 is less than the predetermined pressure difference, and the flow limiting valve 1 is in the first position; in the non-energy-regeneration mode, the pressure difference between two sides of the flow limiting valve 1 is larger than the predetermined pressure difference, and the flow limiting valve 1 is in the second position.

In a special case, for example, when a downstream hydraulic flexible hose is broken, the flow of the hydraulic oil from the hydraulic cylinder 8 suddenly increases such that the pressure difference between two sides of the flow limiting valve 1 becomes abnormal, and when the pressure difference between two sides of the flow limiting valve 1 is larger than the predetermined pressure difference, the flow limiting valve 1 switches to the second position with higher throttling resistance to limit the flow rate of the hydraulic fluid, and the accelerated descent of the work platform in the special case may be avoided.

The flow limiting valve 1 of an embodiment of the present application is provided adjacent to an outlet of the hydraulic cylinder 8, which may improve stability of the lifting mechanism. Specifically, if the flow limiting valve 1 and the hydraulic cylinder 8 are connected via the hydraulic line therebetween, when such portion of the hydraulic line is broken, the flow limiting valve 1 may not take effect, that is, it may not limit the accelerated descent of the work platform, thus threatening safety of personal on the work platform. Therefore, in the present application, by providing the flow limiting valve 1 at the outlet of the hydraulic cylinder 8, it may be ensured that even if any portion of the hydraulic line of the whole system is broken, the flow limiting valve 1 may take effect such that the work platform may descend smoothly, and thus the safety of the lifting mechanism may be ensured.

In the energy-regeneration mode, it is necessary to convert potential energy of the hydraulic fluid into kinetic energy of the electric machine 4 and then into electric energy. Therefore, it is necessary to have a relatively low throttling resistance between the hydraulic fluid in the hydraulic cylinder 8 and the hydraulic line, to facilitate conversion of potential energy of the hydraulic fluid into kinetic energy to drive running of the electric machine 4. In the non-energy-regeneration mode, the potential energy is consumed at the orifice, and converted into thermal energy, and the hydraulic fluid flows slowly at a constant rate to the oil tank 9 to ensure smooth and stable descending of the work platform. Therefore, if there is no failure in the lifting mechanism, in the energy-regeneration mode, the flow limiting valve 1 is in the first position with low throttling resistance, while in the non-energy-regeneration mode, the flow limiting valve 1 is in the second position with high throttling resistance.

In an embodiment of the present application, the flow limiting valve 1 comprises a first orifice 11 and a selection valve 12 connected with each other. The selection valve 12 comprises a second orifice 121 having a size less than that of the first orifice 11. The flow limiting valve 1 has a communicating position and a throttling position in which the second orifice 121 takes effect. The flow limiting valve 1 has a throttling resistance in the communicating position lower than that in the throttling position. When the flow limiting valve 1 is in the first position, the selection valve 12 is in the communicating position, and when the flow limiting valve 1 is in the second position, the selection valve 12 is in the throttling position. The maximum flow rate of the hydraulic fluid is defined by the second orifice 121. That is, the maximum of the descending speed of the work platform is defined by the second orifice 121. The safe performance of the lifting mechanism may be ensured.

In an embodiment of the present application, the selection valve 12 further comprises a spring 122. When the pressure difference between two sides of the flow limiting valve 1 is less than a predetermined pressure difference set by the spring 122, the selection valve 12 is in the communicating position; when the pressure difference between two sides of the flow limiting valve 1 is larger than the predetermined pressure difference set by the spring 122, the selection valve 12 is in the throttling position. Specifically, a branch between the first orifice 11 and the outlet of the hydraulic cylinder 8 is communicated with a side of the selection valve 12 away from the spring 122, and the side of the flow limiting valve 1 away from the hydraulic cylinder is communicated via the branch with the side of the selection valve 12 where the spring 122 is provided. When the pressure difference between two sides of the flow limiting valve 1 is too large, the pressure difference of the hydraulic fluid between two sides of the selection valve 12 is larger than the spring force of the spring 122 connected to the first side of the selection valve 12, thus in turn compressing the spring 122 such that the selection valve 12 is switched from the communicating position to the throttling position.

By using the flow limiting valve 1 of hydraulic feedback type to limit the maximum of the descending speed of the work platform, possible failures in solutions including an electric control valve and a sensor, such as electric power failure or sensor failure, may be avoided, resulting in a higher safety level and a longer life.

Though the flow limiting valve 1 in the present embodiment comprises the first orifice 11 and the selection valve 12 by which the automatic switching may be achieved with a relatively low cost in response to the pressure difference, it is also possible to use a proportional valve as the flow limiting valve 1 as long as it has the communicating position and the throttling position. When a proportional valve is used, it may continuously adjust the throttling resistance, and in turn may continuously adjust the maximum of the descending speed of the work platform, and the controlling precision may be improved. When the flow limiting valve 1 is a proportional valve, it is possible to control its valve element position according to a pressure in the hydraulic cylinder 8 as detected by a pressure sensor. Specifically, it is possible to use a calibration method to set a maximum permissible opening degree of the proportional valve, thus limiting the maximum of the descending speed under such pressure. If the work platform (platform, which corresponds to the pressure of the hydraulic cylinder) is heavy, the maximum permissible opening degree of the proportional valve is relatively small; if the platform is light, the maximum permissible opening degree of the proportional valve is relatively large. Certainly, it is also possible to directly set the maximum permissible opening degree of the proportional valve according to a maximum bearing weight permitted by the platform, without any calibration.

It may be understood that the high or low throttling resistance as mentioned in the present application is a relative expression, rather than defining the specific resistance range thereof, as long as the throttling resistance in the second position is higher than the throttling resistance (which may be zero) in the first position.

It should be understood that the proportional valve or switch valve 2 may be any one of proportional valves, or switch valves.

In an embodiment, when the proportional valve or switch valve 2 is a proportional valve, it not only may be switched to the unidirectional communication position 21 (i.e. the proportional valve has a minimum opening degree) or the bidirectional communication position 22 (i.e. the proportional valve has a maximum opening degree), but also may adjust the throttling resistance by adjusting the opening degree of the proportional valve, thus in turn adjusting the descending speed of the work platform. Thus, the controlling precision may be improved.

Specifically, in the energy-regeneration mode of the descending mode, the proportional valve or switch valve 2 is in the bidirectional communication position 22 and the descending speed of the work platform is controlled by the electric machine 4; in the non-energy-regeneration mode of the descending mode, the descending speed of the work platform may be set by the opening degree of the proportional valve or switch valve 2; in an abnormal descending of the work platform, the maximum of the descending speed of the work platform is set by the flow limiting valve 1.

When the proportional valve or switch valve 2 is a proportional valve, even if a line between the proportional valve or switch valve 2 and the oil tank 9 is broken, the proportional valve or switch valve 2 may control the descending speed of the work platform. If a hydraulic line between the proportional valve or switch valve 2 and the flow limiting valve 1 is broken, the proportional valve or switch valve 2 may not control the descending speed of the work platform, and the flow limiting valve 1 controls the throttling resistance and in turn controls the descending speed of the work platform.

Figure 2:
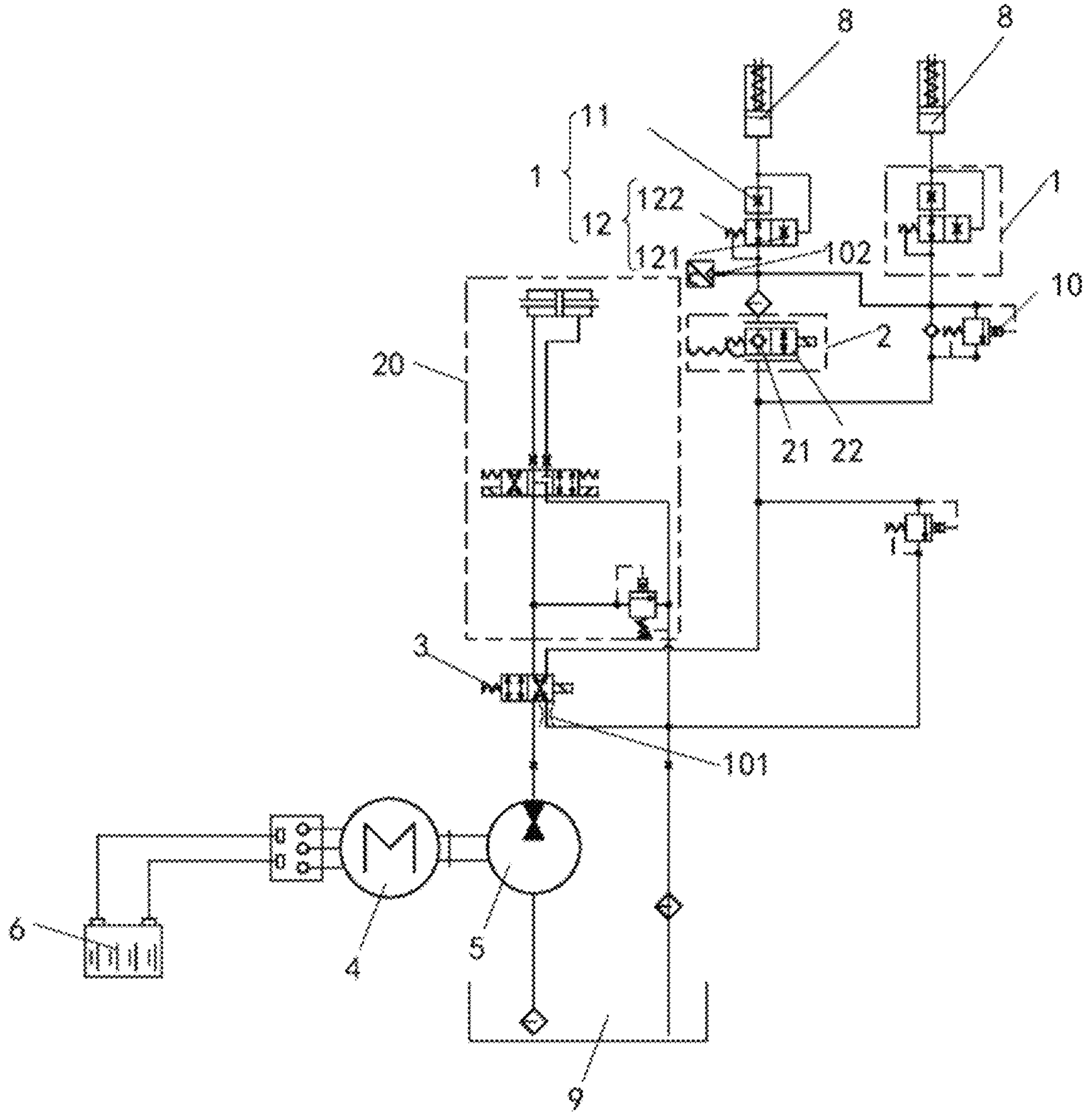
FIG. 2 is a hydraulic schematic diagram of a lifting mechanism as provided in an embodiment of the present application.

FIG. 2 is a hydraulic schematic diagram of a lifting mechanism as provided in an embodiment of the present application. As shown in FIG. 2, the present embodiment differs from the previous embodiment in that the lifting mechanism of the present embodiment further comprises a throttle valve 101 provided between the reversing valve 3 and the oil tank 9.

Figure 3:
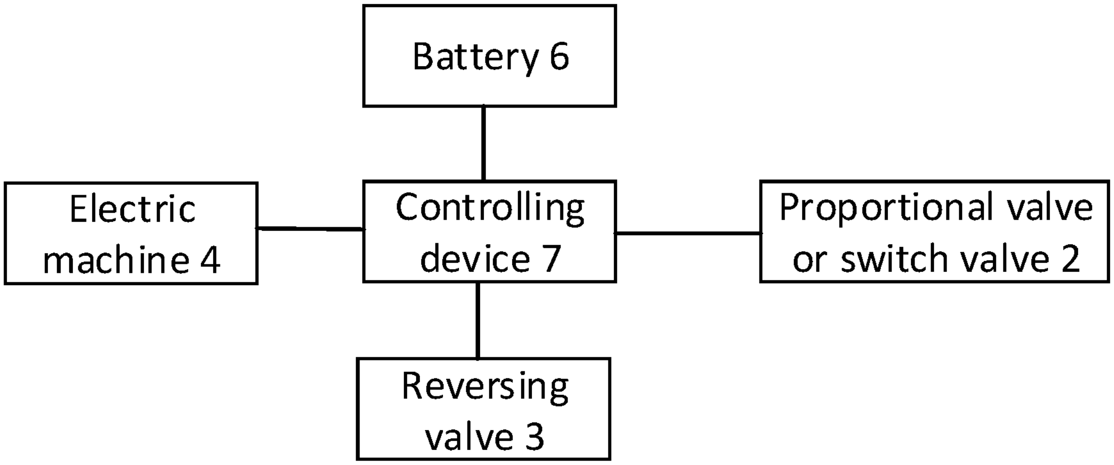
FIG. 3 is a circuit schematic diagram of a lifting mechanism as provided in an embodiment of the present application.

The specific position of the throttle valve 101 may be freely adjusted between the reversing valve 3 and the oil tank 9. For example, as shown in FIG. 3, the throttle valve 101 is disposed on the hydraulic line adjacent to a lower end of the reversing valve 3. The throttle valve 101 has a hole with a size less than that of the second orifice 121. The throttle valve 101 may be a simple valve having a orifice, or may be any valve providing throttling function (such as a proportional valve). Specifically, it differs from the first embodiment in that in the non-energy-regeneration mode, it is possible to use the throttle valve 101 (rather than the flow limiting valve 1) to control the descending speed of the hydraulic fluid. The flow limiting valve 1, in normal operation cases (including the ascending mode, the hold mode, the energy-regeneration mode and the non-energy-regeneration mode), is always in the communicating position, and is switched to the throttling position only in abnormal cases, such as the hydraulic line being broken. By such configuration, it is possible to reduce the frequency of switching of the flow limiting valve 1 and reduce the time duration in which the flow limiting valve 1 is in the throttling position such that the service life of the flow limiting valve 1 may be longer and the safety of the whole lifting mechanism is ensured. Compared with the flow limiting valve 1, the throttle valve 101 is low in cost and is easy to be replaced, and it is possible to reduce the cost by providing the throttle valve 101 between the reversing valve 3 and the oil tank 9. In the ascending mode, the hold mode and the energy-regeneration mode, the hydraulic fluid does not pass through the hydraulic line between the reversing valve 3 and the oil tank 9, and the throttle valve 101 provided between the reversing valve 3 and the oil tank 9 will not affect normal flowing of the hydraulic fluid in the ascending mode, the hold mode and the energy-regeneration mode of the lifting mechanism.

The present embodiment shows two hydraulic cylinders 8, and a corresponding flow limiting valve 1 is provided adjacent to the outlet of each hydraulic cylinder 8. The provided two hydraulic cylinders 8 may improve the maximum load of the lifting mechanism. The number and model of the hydraulic cylinders 8 may be adaptively adjusted according to the specific application circumstances of the lifting mechanism.

In addition, an overflow valve 10 is provided in parallel to the proportional valve or switch valve 2.

It should be understood that the lifting mechanism may be adaptively adjusted according to the requirements and based on the principle of the embodiment(s) of the present application. It is possible to remove or add some part(s) in the lifting mechanism. It is also possible to adjust the model(s) of the various parts in the lifting mechanism according to the requirements. In an embodiment, the steering system and the lifting system are controlled individually, rather than being switched by the reversing valve 3. In another embodiment, it is possible to add a detection component, such as a pressure sensor 102 and a speed sensor, in the lifting mechanism, and it is also possible to use a plurality of hydraulic cylinders 8 to improve the maximum load of the lifting mechanism.

FIG. 3 is a circuit schematic diagram of a lifting mechanism as provided in an embodiment of the present application. As shown in FIG. 3, the lifting mechanism comprises a controlling device 7 which is electrically connected with the battery 6, the electric machine 4, the reversing valve 3 and the proportional valve or switch valve 2.

The controlling device 7 may comprise one or more controllers, such as a motor controller, a valve controller, or a main controller which determines motor rotation speed/direction and a position of valve according to the operator input and the controlling logic, as long as these functions may be achieved.

As shown in FIGS. 1 and 3, the controlling device 7 is configured to enter the ascending mode in response to receiving an ascending command. Therefore, the lifting mechanism switches from the hold mode or the descending mode to the ascending mode. Specifically, the controlling device 7, in response to receiving an ascending command, controls the proportional valve or switch valve 2 to switch to the unidirectional communication position 21, controls the reversing valve 3 to a state in which the hydraulic cylinder 8 is connected with the hydraulic pump 5, and controls the electric machine 4 to drive running of the hydraulic pump 5, to pump the hydraulic fluid from the oil tank 9 into the hydraulic cylinder 8, thus in turn pushing a telescopic rod in the hydraulic cylinder 8 to move upward to raise the work platform which is connected directly or indirectly with the telescopic rod.

The controlling device 7 is further configured to, in response to receiving a descending command, switches the proportional valve or switch valve 2 to the bidirectional communication position 22. Therefore, the lifting mechanism switches from the hold mode to the descending mode.

The controlling device 7 is further configured to, in response to receiving a descending command, increase the pressure in the hydraulic line and then switch to the descending mode. In the hold mode, the pressure between the hydraulic cylinder 8 and the proportional valve or switch valve 2 is relatively high, and the line pressure between the proportional valve or switch valve 2 and the hydraulic pump 8 is relatively low. Thus, when it is switched from the hold mode to the descending mode, if the line pressure between the proportional valve or switch valve 2 and the hydraulic pump 8 is not increased in advance, at the moment when the proportional valve or switch valve 2 is switched to the bidirectional communication position 22, the oil with high pressure on the upper side will be communicated with the line with low pressure on the lower side such that the pressure in the line with low pressure on the lower side is increased instantly, compressing the hydraulic fluid in the line with low pressure, and the work platform will descend suddenly.

Specifically, increasing the pressure in the hydraulic line may be increasing the pressure in the hydraulic line between the hydraulic pump 5 and the proportional valve or switch valve 2, such that the pressure difference between said pressure of the hydraulic line (between the hydraulic pump 5 and the proportional valve or switch valve 2) and the pressure in the hydraulic cylinder 8 is less than a predetermined value, or such that said pressure in the hydraulic line (between the hydraulic pump 5 and the proportional valve or switch valve 2) is same or substantially same as the pressure in the hydraulic cylinder 8. The predetermined value may be determined according to several factors, such as the precision of the lifting mechanism. Thus, at the moment when the proportional valve or switch valve 2 is switched from the unidirectional communication position 21 to the bidirectional communication position 22, the accelerated descent of the hydraulic fluid due to an excessive pressure difference between two sides of the proportional valve or switch valve 2 may be avoided, and in turn it may be ensured that the work platform, after being switched to the descending mode, descends smoothly and stably.

Specifically, when receiving a descending command, the controlling device 7 controls running of the hydraulic pump 5 to increase the pressure in the hydraulic line. When the pressure difference between the hydraulic cylinder 8 and the hydraulic line is less than a predetermined value or when the hydraulic pump 5 has run for a predetermined period of time, the controlling device 7 controls the proportional valve or switch valve 2 to switch to the bidirectional communication position 22 such that the lifting mechanism is switched to the descending mode.

For example, the controlling device 7 controls the proportional valve or switch valve 2 to switch from the unidirectional communication position 21 to the bidirectional communication position 22 after it receives a descending command and after the hydraulic pump has run for a predetermined period of time.

For example, the controlling device 7 switches from the unidirectional communication position 21 to the bidirectional communication position 22 after it receives a descending command and when the pressure difference between upper and lower ends of the proportional valve or switch valve 2 is less than a predetermined value or equal to zero.

The controlling device 7 is configured to, under a predetermined condition, switch the position of the reversing valve 3 such that the hydraulic cylinder 8 is switched from connection with the hydraulic pump 5 to connection with the oil tank 9, so as to switch from the energy-regeneration mode to the non-energy-regeneration mode. That is, according to whether to perform energy recycling by the lifting mechanism, the position of the reversing valve 3 is switched. Specifically, the predetermined condition comprises any one of state-of-charge of the battery 6 higher than a predetermined value, failure of the battery 6, failure of the electric machine 4, and other system line failures. Also, the predetermined condition may be receiving a controlling command from the operator to facilitate manipulation of the work platform by the operator according to the requirements. For example, when the state-of-charge of the battery 6 is higher than 80%, the controlling device 7 controls the lifting mechanism to switch from the energy-regeneration mode to the non-energy-regeneration mode. Specifically, when the state-of-charge of the battery 6 is higher than a predetermined value, charging the battery 6 will cause overheating of the battery 6, thus shortening the life thereof. Therefore, when the state-of-charge of the battery 6 is higher than a predetermined value, switching to the non-energy-regeneration mode may extend the service life of the battery 6, reducing use cost of the lifting mechanism.

For example, when the electric machine 4 fails, the controlling device 7 controls the lifting mechanism to switch from the energy-regeneration mode to the non-energy-regeneration mode. Specifically, in the case of failure of the electric machine 4, the electric machine 4 may not be used to control the descending speed of the hydraulic fluid so as to control the descending speed of the work platform. Therefore, when the electric machine 4 fails, switching to the non-energy-regeneration mode may ensure smooth and stable descending of the work platform.

In an embodiment, the controlling device 7 is configured to, according to an input command from the user, switch from the energy-regeneration mode to the non-energy-regeneration mode.

The controlling device 7 is further configured to, in the energy-regeneration mode, control the resistance of the electric machine 4 so as to control the descending speed of the hydraulic fluid.

In the present application, a lifting mechanism is provided, and the descending mode of the lifting mechanism comprises the energy-regeneration mode and the non-energy-regeneration mode. The lifting mechanism comprises: a battery, an electric machine, a hydraulic pump, an oil tank, a hydraulic cylinder, a work platform and a flow limiting valve. In the energy-regeneration mode, the hydraulic fluid drives the hydraulic pump to operate as a hydraulic motor, thus in turn driving the electric machine to operate as a generator and charge the battery. In the non-energy-regeneration mode, the flow limiting valve limits the maximum of the descending speed of the work platform. In the present application, the flow limiting valve is used to provide throttling resistance to limit the maximum of the descending speed of the hydraulic fluid, thus in turn defining the maximum of the descending speed of the work platform. Therefore, by defining the maximum of the descending speed of the work platform, the lifting mechanism in the present application, comprising the flow limiting valve, may solve the safety problem due to the accelerated descent of the work platform during descending thereof, and thus the safety of the lifting mechanism may be ensured.

It may be understood from the above disclosure as well as figures and claims that compared with the prior art, the lifting mechanism according to the embodiment(s) of the present application has many possibilities and advantages. It will be further appreciated by those skilled in the art that further modifications and changes may be made to the lifting mechanism according to the present application, without departing from the spirit and scope of the present application. Therefore, such modifications and changes will fall within the claims and be covered by the claims. It should be further understood that the above examples and embodiments are provided for illustrative purpose only, and various modifications, changes or combinations of the embodiments as suggested by those skilled in the art should be included within the spirit and scope of the present application.

The invention claimed is:

1. A lifting mechanism, comprising: a battery, an electric machine, a hydraulic pump, an oil tank, a hydraulic cylinder and a work platform, wherein the lifting mechanism has a descending mode comprising an energy-regeneration mode in which a hydraulic fluid drives the hydraulic pump to operate as a hydraulic motor, thus in turn driving the electric machine to operate as a generator and charge the battery, wherein the descending mode of the lifting mechanism further comprises a non-energy-regeneration mode, and the lifting mechanism further comprises a flow limiting valve, provided between the hydraulic cylinder and the hydraulic pump and between the hydraulic cylinder and the oil tank, for limiting a maximum of a descending speed of the work platform, and wherein the flow limiting valve has a throttling resistance in a first position lower than that in a second position, and when a pressure difference between two sides of the flow limiting valve is larger than a predetermined pressure difference, the flow limiting valve switches from the first position to the second position.

2. The lifting mechanism according to claim 1, wherein the flow limiting valve is provided adjacent to an outlet of the hydraulic cylinder.

3. The lifting mechanism according to claim 1, wherein in the energy-regeneration mode, the flow limiting valve is in the first position, and in the non-energy-regeneration mode, the flow limiting valve is in the second position.

4. The lifting mechanism according to claim 1, wherein the flow limiting valve comprises a first orifice and a selection valve connected with each other, the selection valve has a communicating position and a throttling position in which a second orifice takes effect, when the selection valve is in the communicating position, the flow limiting valve is in a first position, and when the selection valve is in the throttling position, the flow limiting valve is in a second position.

5. The lifting mechanism according to claim 4, wherein the second orifice has a size less than that of the first orifice.

6. The lifting mechanism according to claim 5, wherein in the energy-regeneration mode, the descending speed of the work platform is controlled by the electric machine; in the non-energy-regeneration mode, the maximum of the descending speed of the work platform is set by the second orifice.

7. The lifting mechanism according to claim 4, wherein the selection valve further comprises a spring, when a pressure difference between two sides of the flow limiting valve is less than a predetermined pressure difference set by the spring, the selection valve is in the communicating position; when the pressure difference between two sides of the flow limiting valve is larger than the predetermined pressure difference set by the spring, the selection valve is in the throttling position.

8. The lifting mechanism according to claim 1, wherein the lifting mechanism further comprises: a reversing valve which performs switching between the energy-regeneration mode and the non-energy-regeneration mode by selectively connecting the hydraulic cylinder to the hydraulic pump or the oil tank.

9. The lifting mechanism according to claim 8, wherein the lifting mechanism further comprises a steering device, and the reversing valve connects one of the hydraulic pump and the oil tank to the steering device and connects the other of the hydraulic pump and the oil tank to the hydraulic cylinder.

10. The lifting mechanism according to claim 1, wherein the lifting mechanism further comprises: a throttle valve, in the energy-regeneration mode or the non-energy-regeneration mode, the flow limiting valve is in the first position, and in an abnormal descending of the work platform, the flow limiting valve is in the second position.

11. The lifting mechanism according to claim 1, wherein the lifting mechanism further comprises a proportional valve or switch valve connected to the flow limiting valve; when the proportional valve or switch valve is a proportional valve, in the energy-regeneration mode, the descending speed of the work platform is controlled by the electric machine; in the non-energy-regeneration mode, the descending speed of the work platform is set by an opening degree of the proportional valve or switch valve; in an abnormal descending of the work platform, the maximum of the descending speed of the work platform is set by the flow limiting valve.

12. The lifting mechanism according to claim 1, wherein the lifting mechanism is a scissor lift.

13. A lifting mechanism, comprising: a battery, an electric machine, a hydraulic pump, an oil tank, a hydraulic cylinder and a work platform, wherein the lifting mechanism has a descending mode comprising an energy-regeneration mode in which a hydraulic fluid drives the hydraulic pump to operate as a hydraulic motor, thus in turn driving the electric machine to operate as a generator and charge the battery, wherein the descending mode of the lifting mechanism further comprises a non-energy-regeneration mode, and the lifting mechanism further comprises a flow limiting valve, provided between the hydraulic cylinder and the hydraulic pump and between the hydraulic cylinder and the oil tank, for limiting a maximum of a descending speed of the work platform, wherein the lifting mechanism further comprises: a reversing valve which performs switching between the energy-regeneration mode and the non-energy-regeneration mode by selectively connecting the hydraulic cylinder to the hydraulic pump or the oil tank, and wherein the lifting mechanism further comprises: a throttle valve provided between the reversing valve and the oil tank; in the energy-regeneration mode, the descending speed of the work platform is controlled by the electric machine; in the non-energy-regeneration mode, the descending speed of the work platform is set by a size of a hole of the throttle valve; in an abnormal descending of the work platform, the maximum of the descending speed of the work platform is set by the flow limiting valve.

14. A lifting mechanism, comprising: a battery, an electric machine, a hydraulic pump, an oil tank, a hydraulic cylinder and a work platform, wherein the lifting mechanism has a descending mode comprising an energy-regeneration mode in which a hydraulic fluid drives the hydraulic pump to operate as a hydraulic motor, thus in turn driving the electric machine to operate as a generator and charge the battery, wherein the descending mode of the lifting mechanism further comprises a non-energy-regeneration mode, and the lifting mechanism further comprises a flow limiting valve, provided between the hydraulic cylinder and the hydraulic pump and between the hydraulic cylinder and the oil tank, for limiting a maximum of a descending speed of the work platform, wherein the lifting mechanism further comprises: a reversing valve which performs switching between the energy-regeneration mode and the non-energy-regeneration mode by selectively connecting the hydraulic cylinder to the hydraulic pump or the oil tank, and wherein a proportional valve or switch valve is provided between the flow limiting valve and the reversing valve, the proportional valve or switch valve comprises a unidirectional communication position in which the hydraulic fluid is permitted to flow from the hydraulic pump to the flow limiting valve in a unidirectional way, and a bidirectional communication position.

15. The lifting mechanism according to claim 14, wherein the lifting mechanism further comprises: a controlling device, which, upon receiving a descending command, switches the proportional valve or switch valve to the bidirectional communication position, and under a predetermined condition, switches a position of the reversing valve such that the hydraulic cylinder is switched from a state of connection with the hydraulic pump to a state of connection with the oil tank, to switch from the energy-regeneration mode to the non-energy-regeneration mode.

16. The lifting mechanism according to claim 15, wherein the predetermined condition comprises any one of: state-of-charge of the battery higher than a predetermined value, failure of the battery, and failure of the electric machine.

17. The lifting mechanism according to claim 14, wherein the lifting mechanism comprises two or more hydraulic cylinders, a corresponding flow limiting valve is provided adjacent to an outlet of each hydraulic cylinder, and each flow limiting valve is connected to the proportional valve or switch valve.

18. The lifting mechanism according to claim 14, wherein the lifting mechanism further comprises an overflow valve provided in parallel to the proportional valve or switch valve.

* * * * *